United States Patent
Schoendorff et al.

(10) Patent No.: US 6,773,264 B2
(45) Date of Patent: Aug. 10, 2004

(54) TEACHING APPARATUS FOR MECHANICS PRINCIPLES

(76) Inventors: Arthur Joseph Schoendorff, 42550 Park Ridge, Novi, MI (US) 48375; Alan Finch, 1215 Doral Ct., Troy, MI (US) 48085

( * ) Notice: Subject to any disclaimer, the term of this patent is extended or adjusted under 35 U.S.C. 154(b) by 0 days.

(21) Appl. No.: 10/688,555

(22) Filed: Oct. 17, 2003

(65) Prior Publication Data

US 2004/0115594 A1 Jun. 17, 2004

Related U.S. Application Data

(60) Provisional application No. 60/419,297, filed on Oct. 18, 2002.

(51) Int. Cl.[7] .............................................. G09B 23/06
(52) U.S. Cl. ...................... 434/300; 434/302; 434/276; 446/166; 446/431
(58) Field of Search ................................. 434/276, 373, 434/289, 401, 302, 67; 446/166, 448, 449

(56) References Cited

U.S. PATENT DOCUMENTS

| | | | | | |
|---|---|---|---|---|---|
| 1,604,294 A | * | 10/1926 | Louis | ......................... | 446/166 |
| 5,009,602 A | * | 4/1991 | Chandler | .................... | 434/300 |
| 5,775,917 A | * | 7/1998 | Louviere | .................... | 434/300 |
| 5,788,552 A | * | 8/1998 | Alioto | ......................... | 446/85 |
| 6,722,940 B1 | * | 4/2004 | Weikel | ....................... | 446/464 |

FOREIGN PATENT DOCUMENTS

GB          2217897 A  * 11/1989  ........... G09B/23/08

* cited by examiner

Primary Examiner—Derris H. Banks
Assistant Examiner—Dmitry Suhol
(74) Attorney, Agent, or Firm—Brooks Kushman, P.C.

(57) ABSTRACT

A mechanically propelled apparatus for teaching principles of mechanics. The apparatus includes a drive wheel disposed on a first axis of rotation and a power drum disposed on a second axis of rotation. At least one flexible tensile member transmits energy from a weight to the drive wheel via the power drum to propel the apparatus.

31 Claims, 3 Drawing Sheets

TEACHING APPARATUS FOR MECHANICS PRINCIPLES

CROSS-REFERENCE TO RELATED APPLICATIONS

This application claims the benefit of U.S. provisional application Ser. No. 60/419,297 filed Oct. 18, 2002.

BACKGROUND OF THE INVENTION

1. Field of the Invention

The present invention relates to an apparatus for teaching principles of mechanics and more particularly to an apparatus that can be mechanically propelled and perform experiments related to principles of motion.

2. Background Art

Academic courses covering basic principles of physics, such as mechanics and dynamics, may use teaching aids or hands-on experiments to supplement textual materials. Prior teaching aids or devices consisted of fixed position equipment that could be configured to perform a particular experiment. For example, an apparatus for teaching principles of kinetic and potential energy may consist of rolling a ball down a stationary inclined track and making appropriate measurements and observations. Such teaching aids or devices cannot be easily adapted to perform multiple or different types of experiments. As a result, additional equipment must be purchased to perform different experiments. Such purchases may be cost prohibitive in an educational setting, especially when many devices must be procured to provide students with adequate access and/or time to conduct experiments. In addition to being cost prohibitive, using different equipment for each experiment inhibits students from drawing inferences and analogies that become apparent when a single device is reconfigured to perform multiple experiments.

Before applicant's invention, there was a need for an apparatus or system for assisting in teaching principles of mechanics and for an apparatus or system that could be cost-effectively reconfigured to perform multiple experiments. Problems associated with the prior art as noted above and other problems are addressed by the applicant's invention as summarized below.

SUMMARY OF THE INVENTION

According to one aspect of the present invention, a mechanically propelled apparatus for teaching principles of mechanics is provided. The apparatus includes a drive wheel supported by a frame and rotatable about a first axis of rotation and a power drum supported by the frame and rotatable about a second axis of rotation. The drive wheel has a peripheral surface for rolling in contact with a support surface and a relatively smaller cylindrical drive surface. At least one flexible tensile member transmits energy from a weight to the drive wheel via the power drum. Movement of the weight causes the power drum and the drive wheel to turn, thereby propelling the apparatus.

A support member may be pivotably connected to a platform and configured to support the power drum. The support member may pivot between vertical and horizontal positions and may be secured in an intermediate position between the vertical and horizontal positions. The support member may include an aperture for receiving a pin that engages the power drum and prevents the power drum from rotating about the first axis of rotation. The first axis of rotation may be parallel to and/or positioned below the second axis of rotation.

The power drum may include first and second portions disposed concentric to the second axis of rotation. The first portion may have a larger or smaller diameter than the second portion.

The drive wheel may include a wheel portion, a drive spool portion, and a flange having a slot and/or an aperture. The aperture may be configured to receive a pin for manually turning the drive wheel. The drive spool portion may have a smaller diameter than the wheel portion.

A first flexible tensile member may be connected to the power drum at a first end and wrapped around the drive spool portion at a second end. The second end may include a ball portion. The slot in the drive wheel may be configured to receive the ball portion when the first flexible tensile member is wound around the spool portion and release the ball portion when the first flexible tensile member is unwound from the spool portion. The first flexible tensile member may be unwound from the drive spool portion and wound around the power drum when the power drum is turned. The first flexible tensile member may engage the first portion of the power drum having a larger diameter than the second portion to decrease torque at the drive wheel. The first flexible tensile member may also engage a second portion having a smaller diameter than the first portion to decrease rotational velocity of the drive wheel.

A second flexible tensile member may be connected to the weight at a first end and wound around the first or second portion of the power drum at a second end.

A line catcher may be configured to secure the second end of the first flexible tensile member when the second end is spaced apart from the drive wheel. The line catcher may be configured to stop the first flexible tensile member from winding around the power drum after the first flexible tensile member is disengaged from the drive wheel.

According to another aspect of the invention, a mechanically propelled vehicle for conducting mechanics experiments is provided. The vehicle includes first and second wheels rotatably attached to a chassis. A support member is pivotably coupled to the chassis and selectively moveable between an upright position and a horizontal position. A power drum is rotatably attached to the support member. A first flexible tensile member is selectively coupled to the power drum and configured to turn the first wheel when the power drum is rotated. A second flexible tensile member is attached to the power drum at a first end and attached to a weight at a second end. When the weight is released from a raised position above the chassis, the power drum rotates and winds the first flexible tensile member around the power drum and unwinds the first flexible tensile member from the first wheel to propel the vehicle.

According to another aspect of the present invention, an apparatus for teaching principles of mechanics and performing experiments is provided. The apparatus includes a power drum rotatable about a first axis of rotation and having first and second spool portions. A drive wheel is rotatably attached to the apparatus along a second axis of rotation and includes wheel and drive spool portions. A first flexible tensile member for transmitting force to the drive wheel is configured to be wound around either the first spool portion or the second spool portion. A second flexible tensile member is attached to the weight and is configured to be wound around the first or second spool portion that is not engaged by the first flexible tensile member. The first flexible tensile member unwinds from the drive wheel and the second flexible tensile member unwinds from the power drum as the weight falls from an elevated position. The first flexible tensile member may be disengaged from the drive spool portion when force is not being transmitted to the drive wheel.

The apparatus may include an arm assembly having an arm member and a wheel. The arm member may be pivotal about the first axis of rotation. The wheel may be disposed on a third axis of rotation and configured to support the arm member when the arm member is disposed in a substantially horizontal deployed position. The arm member may be pivotable between a stored position where the arm member contacts the chassis and the deployed position. The arm member may also be disposed in a substantially vertical jack position to raise the drive wheel. A data acquisition device, such as a transducer, may be attached to the arm member to detect movement of the wheel. Alternately, the data acquisition device may be attached to the apparatus.

DETAILED DESCRIPTION OF THE PREFERRED EMBODIMENT(S)

Figure 1:
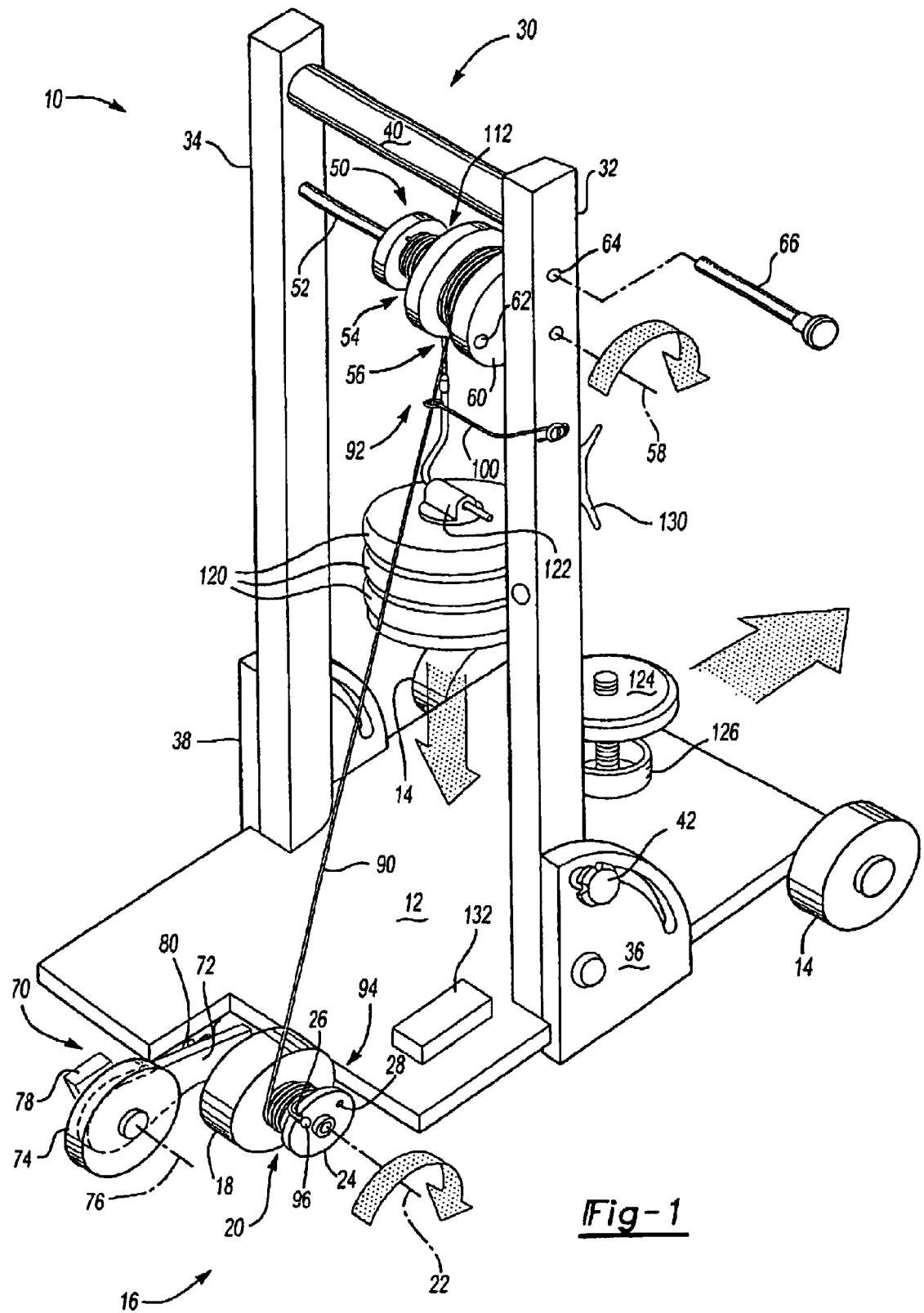
FIG. 1 is a perspective view of an apparatus for teaching principles of mechanics.

Referring to FIG. 1, a perspective view of a teaching apparatus 10 is shown. The teaching apparatus 10 may configured to perform a variety of experiments that may be quantitatively evaluated. These experiments may include, but not be limited to, assessments of acceleration, kinetic and potential energy, friction, inertia, torque, center of gravity, kinematics, impulse, momentum, and work.

The teaching apparatus 10 includes a platform or chassis 12. The chassis 12 may be made from any suitable material, such as wood, metal, or plastic. Wheels 14 are rotatably attached to the chassis 12. The wheels 14 may be attached to the chassis 12 in any suitable manner, such as by axles. In the embodiment shown in FIG. 1, two wheels are shown. However, any number of wheels could be employed. The wheels 14 may have any suitable geometry and may be made of any suitable material, such as wood, metal, or a polymeric material such as polyethylene. Optionally, the outer surface of the wheels 14 or a portion thereof may be covered with a material having a high coefficient of friction, such as rubber.

A drive wheel 16 is used to propel the teaching apparatus 10. The drive wheel 16 may be attached to the chassis 12 in any suitable manner, such as with an axle. In addition, the drive wheel 16 may have any suitable geometry and may be made of any suitable material, such as wood, metal, or a polymeric material such as polyethylene. The outer surface of the drive wheel 16 or a portion thereof may be covered with a material having a high coefficient of friction, such as rubber.

The drive wheel 16 may include a wheel portion 18 and a drive spool portion 20. The wheel portion 18 and drive spool portion 20 are concentric with a first axis of rotation 22. The drive spool portion 20 has a smaller diameter than the wheel portion 18. Optionally, the drive wheel 16 could be provided with multiple drive spool portions each having different diameters. A flange 24 may be located at an end of the drive wheel 16. In the embodiment shown in FIG. 1, the flange 24 is adjacent to the drive spool portion 20. The flange 24 may include a slot 26 and an aperture 28, the function of which will be discussed in more detail below. Alternately, the slot 26 and aperture 28 could be integrated with the wheel portion 18.

A support assembly 30 may be pivotably attached to the chassis 12. In the embodiment shown in FIG. 1, the support assembly 30 includes first and second support members 32, 34, first and second brackets 36, 38, and a crossbar 40. The support members 32, 34, brackets 36, 38 and crossbar 40 may be made of any suitable material, such as wood, metal, or plastic. The first and second brackets 36, 38 are attached to the chassis 12 and include slots 42 and 44, respectively. The first and second support members 32, 34 are pivotably attached to the first and second brackets 36 and 38, respectively. The crossbar 40 may be disposed near an end of the support members 32, 34 and may be used as a handle for carrying the teaching apparatus 10. Retaining members 42 are used to secure the support members 32, 34 in a fixed position. For example, the retaining members 42, which may be threaded knobs, may be tightened to hold the support members 32, 34 in an upright or vertical position, a horizontal position, or any intermediate position. The support assembly 30 is shown in an upright position by solid lines in FIG. 2. The support assembly 30 is also shown in a representative intermediate position by phantom lines in FIG. 2. The support assembly 30 may also be disposed in a horizontal position parallel to the chassis 12 to facilitate storage.

The support assembly 30 is configured to support a power drum 50. In the embodiment shown in FIG. 1, the power drum 50 is disposed on a shaft 52 connected to support members 32 and 34. Alternately, the shaft 52 may be connected to a single support member or crossbar 40. Optionally, the power drum 50 may be configured as one or more interconnected pulleys.

The power drum 50 includes a first spool portion 54 and a second spool portion 56. The first and second spool portions 54, 56 and shaft 52 are disposed concentric with a second axis of rotation 58. The first spool portion 54 is shown having a smaller diameter than the second spool portion 56. Alternately, the first spool portion 54 could have a larger diameter or the same diameter as the second spool portion 56.

The power drum 50 also includes an end flange 60. The end flange 60 may include a first aperture 62. The first support member 32 may include a corresponding second aperture 64. A pin 66 may be inserted through the first and second apertures 62, 64 to prevent the power drum 50 from rotating and/or inhibit the unintended launch of the teaching apparatus 10. Optionally, the second aperture 64 may be disposed in the second support member 34.

The teaching apparatus 10 may also include an arm assembly 70. The arm assembly 70 includes an arm member 72 and a wheel 74. The arm assembly 70 is pivotable about the first axis of rotation 22. The wheel 74 is rotatably attached to the arm member 72 in any suitable manner, such as with an axle. The wheel 74 is disposed on a third axis of rotation 76. The arm assembly 70 may also include a data acquisition device 78, such as a transducer for detecting movement of the wheel 74. The data acquisition device may be connected to an external monitoring or recording device (not shown).

Figure 2:
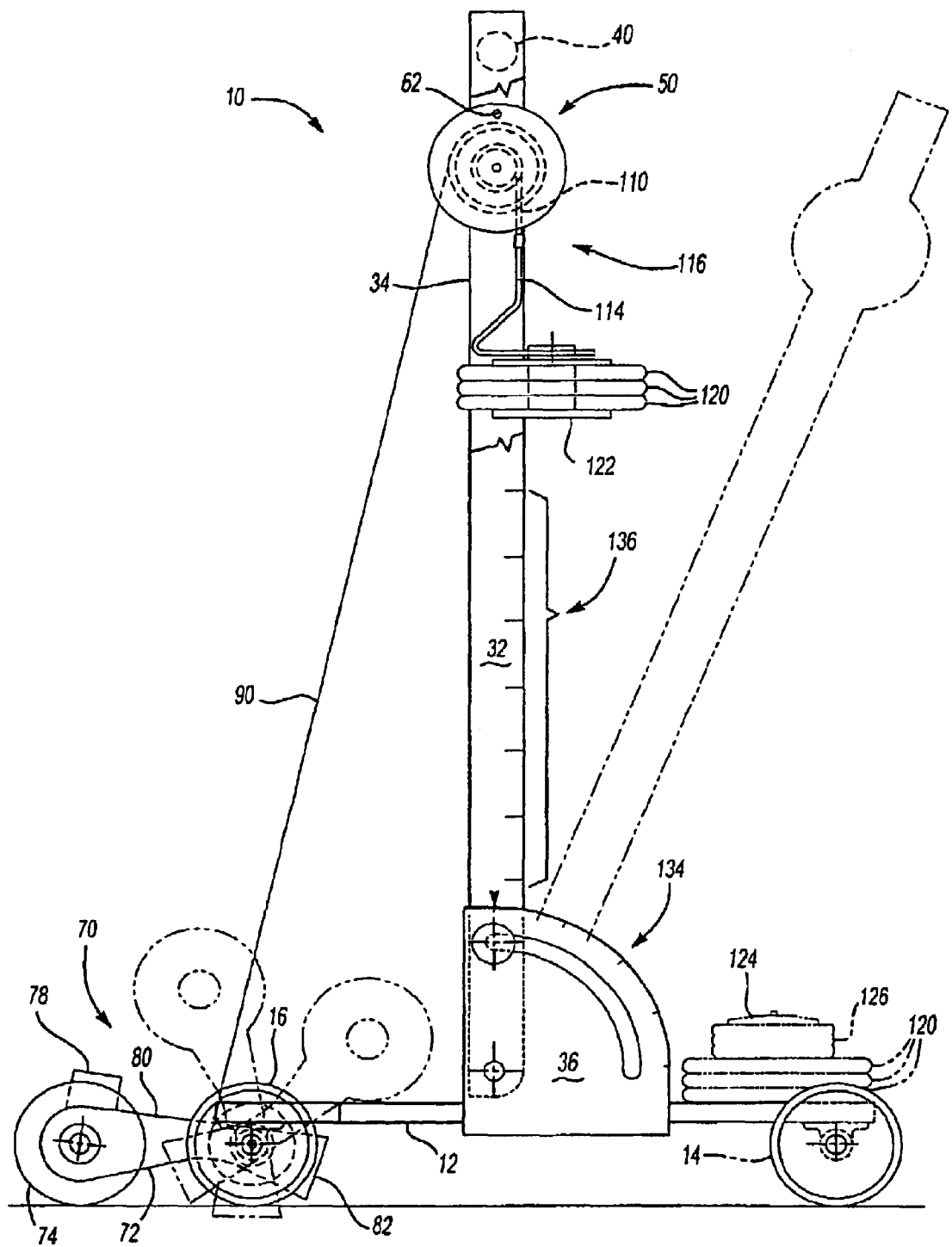
FIG. 2 is a side view of the apparatus.

Referring to FIG. 2, the arm assembly 70 may be disposed in a deployed position, a storage position, or a jack position. In the deployed position, shown by solid lines in FIG. 2, the arm member 72 is substantially horizontal and parallel to the chassis 12. The wheel 64 is positioned behind the chassis 12 where it rotates as the teaching apparatus 10 moves. In the storage position, shown in phantom in FIG. 2, the arm assembly 70 is positioned such that a surface 80 of the arm member 72 contacts the chassis 12 and the wheel 74 does not rotatably follow the teaching apparatus 10 when it moves. In the jack position, also shown in phantom in FIG. 2, the arm assembly 70 is positioned substantially perpendicular to the chassis 12. A jack surface 82 of the arm member 72 is positioned below the chassis 12 and extends past the drive wheel 16 to lift the chassis 12 off the support surface. As such, the drive wheel 16 is free to rotate or to be cranked without propelling the teaching apparatus 10.

Referring to FIGS. 1 and 2, a drive line or first flexible tensile member 90 may be selectively connected to the drive wheel 16 and the power drum 50. The first flexible tensile member 90 may be made of any suitable material, such as polyester cord, and may be configured as any suitable structure, such as a rope, belt, cable, wire, or chain. The first flexible tensile member 90 has first and second ends 92 and 94. The first end 92 is adapted to engage the power drum 50. More specifically, the first flexible tensile member 90 may be wound around either the first or second spool portions 54, 56 of the power drum 50 depending on the experiment or demonstration being performed. The second end 94 may include as a ball portion 96. The ball portion 96 may be inserted into the slot 26 in the flange 24 of the drive wheel 16. When the ball portion 96 is inserted into the slot 26, the first flexible tensile member 90 may be more easily wound around the drive spool portion 20 of the drive wheel 16. The arm assembly 70 may be deployed in the jack position to facilitate the winding of the first flexible tensile member 90 around the drive spool portion 20. Moreover, pin 66 may be inserted into the flange aperture 28 to manually wind the first flexible tensile member 90 around the drive spool portion 20.

A line catcher 100 may be used to guide and/or secure the first flexible tensile member 90. Specifically, the line catcher 100 may include an opening 102 through which the first flexible tensile member 90 passes. In one embodiment, the opening 102 is smaller than the ball portion 96 to help secure the ball portion 96 when the first flexible tensile member 90 is disengaged from the drive wheel 16 and sufficiently wound around the power drum 50. The line catcher 100 may be attached to the support assembly 30.

A weight line or second flexible tensile member 110 is disposed on the power drum 50. The second flexible tensile member 110 may be made of any suitable material, such as polyester cord, and may be configured as any suitable structure, such as a rope, belt, cable, wire, or chain. In the embodiment shown in FIGS. 1 and 2, one end of the second flexible tensile member 110 is wrapped around the first spool portion 54. Alternately, the second flexible tensile member 110 may be wrapped around the second spool portion 56. The second flexible tensile member 110 may include a hook 112 used to engage one or more weights 120. The weight 120 may have any suitable configuration, such as a donut shape. Alternately, the second flexible tensile member 110 may be tied to one or more weights. Optionally, the hook 112 may be inserted into an aperture in one of the support members 32, 34 to facilitate storage.

A weight holder 122 may be used to hold one or more weights 120. If a weight holder 122 is used, the hook 112 may engage the weight holder 122. The weight holder 122 may also be attached to the chassis 12 when it is not in use for storage. For instance, a fastener 124 may be used to secure the weight holder 122 to the chassis 12. Optionally, a spacer 126 may be inserted between the fastener 124 and the weights 120 to prevent rattling.

A line cleat 130 may be disposed on the support assembly 30 or chassis 12 to secure the second flexible tensile member 110, such as when the teaching apparatus 10 is not in use. In addition, a data acquisition device, such as a level 132, angular scale 134, or scale 136 may be disposed on the chassis 12. The angular scale 134 may be a protractor and may be disposed on the first or second bracket 36, 38 to measure an angle of the support assembly 30 relative to the chassis 12. The scale 136 may be disposed on a support member 32, 34 to measure the distance of the weight 120 from the chassis 12.

Figure 3:
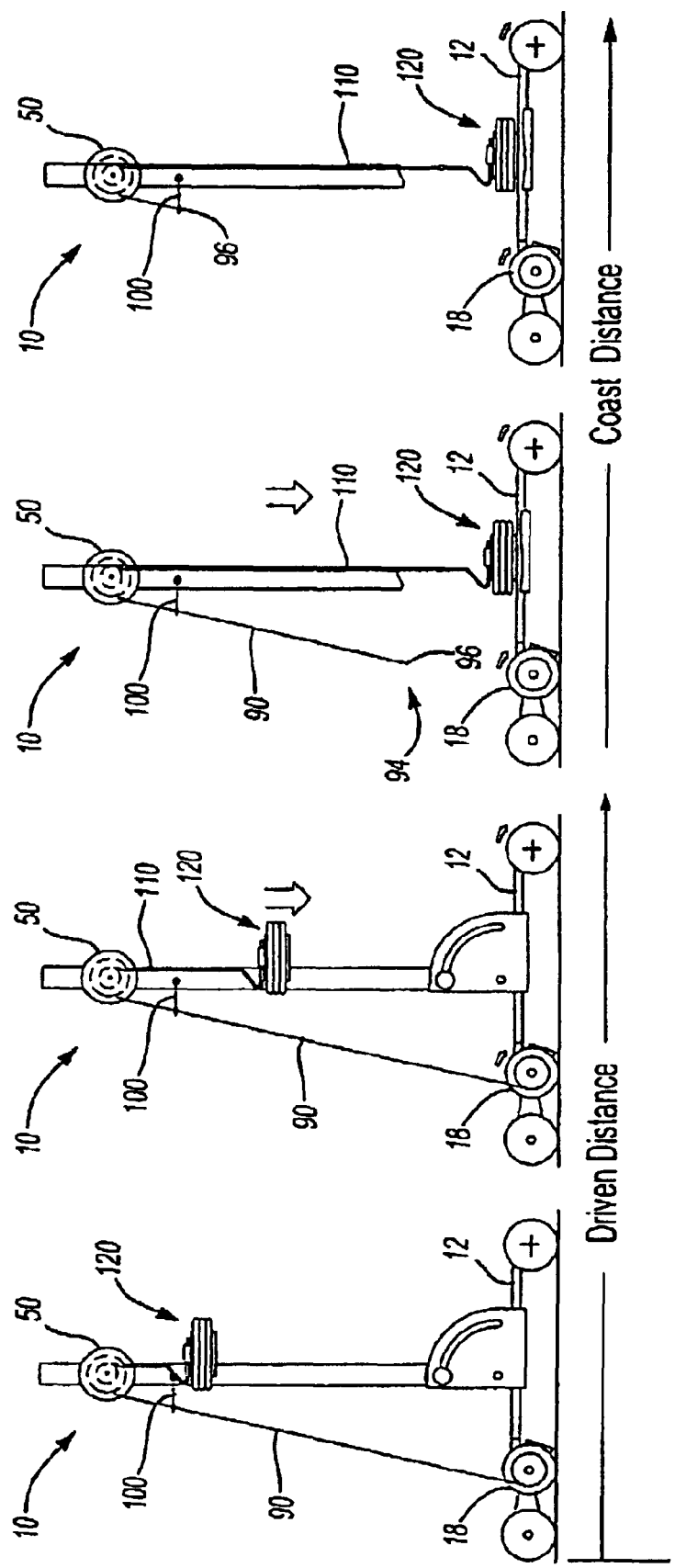
FIG. 3 is a schematic of the apparatus in various positions as the apparatus is propelled.

Referring to FIGS. 1 and 3, a method of propelling the teaching apparatus 10 will now be described. In the embodiment shown in FIGS. 1 and 3, the teaching apparatus 10 is shown with a "rear wheel drive" configuration in which the drive wheel 16 is a rear wheel. More specifically, when the drive wheel 16 is a rear wheel, the teaching apparatus 10 travels in the direction indicated by the arrow disposed parallel to the chassis 12 in FIG. 1. Alternately, the teaching apparatus 10 may be configured to travel in the opposite direction such that the drive wheel 16 is a front wheel by winding the first flexible tensile member 90 around the drive spool portion 20 in a direction opposite that shown in FIG. 1.

In FIG. 3 the teaching apparatus 10 is shown with the support assembly 30 in an upright position and the arm assembly 70 in the deployed position. The first end 92 of the first flexible tensile member 90 is attached to either the first spool portion 54 or the second spool portion 56 of the power drum 50. The second end 94 of the first flexible tensile member 90 is wound around the drive spool portion 20 as previously described. The second flexible tensile member 110 is wound around the first spool portion 54 or the second spool portion 56 not engaged by the first flexible tensile member 90. The pin 66 may be used to secure the power drum 50 and keep it from turning. One or more weights 120 are attached to the free end or hook 112 of the second flexible tensile member 110 such that the weights 120 are disposed in an elevated position above the chassis 12. The weights 120 may be held motionless to help the teaching apparatus 10 experience smooth acceleration.

When the teaching apparatus 10 and/or pin 66 is released, the weights 120 fall toward the chassis 12 due to the force of gravity as indicated by the vertical arrow. The falling weight causes the second flexible tensile member 110 to unwind from the power drum 50. Rotation of the power drum 50 causes the first flexible tensile member 90 to unwind from the drive wheel 16 and wind around the power drum 50. The drive wheel 16 is turned as a result of force exerted by the first flexible tensile member 90 as indicated by the arrow adjacent to the drive wheel 16. The teaching apparatus 10 may continue to roll or "coast" after the weight 120 contacts the chassis 12 and/or the first flexible tensile member 90 disengages from the drive wheel 16 depending on the grade and physical characteristics of the support surface. If the first flexible tensile member 90 disengages from the drive wheel 16, it may continue to wind around the power drum 50 until the ball portion 96 contacts the line catcher 100.

If the first flexible tensile member 90 engages the first spool portion 54 and the second flexible tensile member 110 engages the second spool portion 56, then the drive wheel 16 is turned at a high rotational velocity and low torque. If the first flexible tensile member 90 engages the second spool portion 56 and the second flexible tensile member 110 engages the first spool portion 54, then the drive wheel 16 is turned at a low rotational velocity and high torque. The force or torque may also be changed by modifying the diameter of the drive spool portion 20 or second spool portion 56. For example, a higher force or torque may be provided by increasing the diameter of the drive spool portion 20 by installing an adapter, such as a split ring, around the diameter of the drive spool portion 20. High torque may be desirable if the teaching apparatus 10 is launched up an inclined surface.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A mechanically-propelled apparatus for teaching principles of mechanics, the apparatus comprising:
   a frame;
   a drive wheel supported by the frame and rotatable about a first axis of rotation, the drive wheel having a peripheral surface for rolling in contact with a support surface and a relatively smaller cylindrical drive surface;
   a power drum supported by the frame and rotatable about a second axis of rotation;
   a weight adapted to turn the power drum; and
   at least one flexible tensile member for transmitting energy from the weight to the drive wheel via the power drum;
   wherein movement of the weight causes the power drum and drive wheel to rotate, thereby propelling the apparatus.

2. The apparatus of claim 1 wherein the first axis of rotation is parallel to the second axis of rotation.

3. The apparatus of claim 1 wherein the first axis of rotation is positioned below the second axis of rotation.

4. The apparatus of claim 1 further comprising a support member pivotably connected to the frame and configured to support the power drum.

5. The apparatus of claim 4 wherein the support member is configured to pivot between a vertical position and a horizontal position and is securable in an intermediate position between the vertical and horizontal positions.

6. The apparatus of claim 1 wherein the drive wheel includes a wheel portion and a drive spool portion, the drive spool portion having a smaller diameter than the wheel portion.

7. The apparatus of claim 6 wherein a first flexible tensile member is connected to the power drum at a first end and wrapped around the drive spool portion at a second end such that when the power drum is turned the first flexible tensile member is unwound from the drive spool portion and wound around the power drum, thereby rotating the drive wheel.

8. The apparatus of claim 7 further comprising a line catcher configured to secure the second end when the second end is spaced apart from the drive wheel.

9. The apparatus of claim 7 wherein the second end includes a ball portion and the drive wheel includes a flange having a slot, the slot being configured to receive the ball portion when the first flexible tensile member is wound around the drive spool portion and release the ball portion when the first flexible tensile member is unwound from the drive spool portion.

10. The apparatus of claim 9 wherein the flange further comprises an aperture configured to receive a pin for manually turning the drive wheel to wind the first flexible tensile member around the drive spool portion.

11. The apparatus of claim 1 wherein the power drum includes first and second portions disposed concentric to the second axis of rotation.

12. The apparatus of claim 11 wherein the first portion has a larger diameter than the second portion.

13. The apparatus of claim 11 wherein the second portion has a larger diameter than the first portion.

14. The apparatus of claim 11 further comprising a second flexible tensile member connected to the weight at a first end and wound around the first portion at a second end.

15. The apparatus of claim 1 further comprising an arm member pivotal about the first axis of rotation, the arm member including an arm wheel disposed on a third axis of rotation and configured to support the arm member when the arm member is disposed in a substantially horizontal deployed position.

16. The apparatus of claim 15 wherein the drive wheel does not contact the support surface when the arm member is disposed in a substantially vertical jack position.

17. The apparatus of claim 15 further comprising a data acquisition device attached to the arm member.

18. The apparatus of claim 17 wherein the data acquisition device is a transducer configured to detect movement of the arm wheel.

19. A mechanically propelled vehicle for conducting mechanics experiments, the vehicle comprising:
   a chassis;
   first and second wheels rotatably attached to the chassis;
   a support member pivotably coupled to the chassis and selectively movable between an upright position and a horizontal position;
   a power drum rotatably attached to the support member;
   a first flexible tensile member selectively coupled to the power drum and configured to turn the first wheel when the power drum is rotated; and
   a second flexible tensile member attached to the power drum at a first end and attached to a weight at a second end;
   wherein when the weight is released from a raised position above the chassis, the weight descends toward the chassis, the power drum rotates, and the first flexible tensile member winds around the power drum and unwinds from the first wheel to propel the vehicle.

20. The vehicle of claim 19 wherein the power drum includes first and second portions, the first portion having a larger diameter than the second portion.

21. The vehicle of claim 20 wherein the first flexible tensile member engages the first portion to decrease torque at the first wheel.

22. The vehicle of claim 20 wherein the first flexible tensile member engages the second portion to decrease rotational velocity of the first wheel.

23. The vehicle of claim 19 further comprising an arm assembly disposed adjacent to the first wheel, the arm assembly including an arm member and an arm wheel attached to the arm member, wherein the arm assembly is pivotable between a stored position where the arm member contacts the chassis and a deployed position where the wheel the arm member is disposed substantially parallel to the chassis.

24. The apparatus of claim 23 further comprising a data acquisition device attached to the arm member.

25. The apparatus of claim 24 wherein the data acquisition device is a transducer configured to detect movement of the arm wheel.

26. An apparatus for teaching principles of mechanics and performing related experiments, the apparatus configured to be propelled by force from a weight, the apparatus comprising:

a power drum rotatable about a first axis of rotation and having first and second spool portions;

a drive wheel rotatably attached to the apparatus along a second axis of rotation and having a wheel portion and a drive spool portion;

a first flexible tensile member for transmitting force to the drive wheel, the first flexible tensile member configured to be wound around the first or second spool portion; and a second flexible tensile member attached to the weight and configured to be wound around either the first or second spool portion not engaged by the first flexible tensile member;

wherein the first flexible tensile member unwinds from the drive wheel and the second flexible tensile member unwinds from the power drum as the weight falls from an elevated position.

27. The apparatus of claim 26 wherein the first flexible tensile member is disengaged from the drive spool portion when force is not being transmitted to the drive wheel.

28. The apparatus of claim 26 further comprising a pivotal support member attached to the apparatus and configured to support the power drum.

29. The apparatus of claim 28 wherein the pivotal support member includes an aperture for receiving a pin that engages the power drum and prevents the power drum from rotating about the first axis of rotation.

30. The apparatus of claim 28 further comprising a line catcher configured to stop the first flexible tensile member from winding around the power drum after the first flexible tensile member is disengaged from the drive wheel.

31. The apparatus of claim 26 further comprising a data acquisition device connected to the apparatus.

* * * * *